United States Patent
Hewitt et al.

(10) Patent No.: US 9,079,374 B2
(45) Date of Patent: Jul. 14, 2015

(54) SEALABLE, PEELABLE FILM

(75) Inventors: Jonathan Hewitt, Wigton (GB); Martin Richard Cockroft, Wigton (GB)

(73) Assignee: Innovia Films Limited, Wigton, Cumbria (GB)

( * ) Notice: Subject to any disclaimer, the term of this patent is extended or adjusted under 35 U.S.C. 154(b) by 1070 days.

(21) Appl. No.: 12/598,761

(22) PCT Filed: May 2, 2008

(86) PCT No.: PCT/GB2008/050320
§ 371 (c)(1),
(2), (4) Date: Mar. 1, 2010

(87) PCT Pub. No.: WO2008/135784
PCT Pub. Date: Nov. 13, 2008

(65) Prior Publication Data
US 2010/0189938 A1    Jul. 29, 2010

(30) Foreign Application Priority Data

May 4, 2007 (GB) .................................. 0708692.9

(51) Int. Cl.
| | | |
|---|---|---|
| B32B 27/32 | (2006.01) | |
| B32B 7/06 | (2006.01) | |
| B65B 51/10 | (2006.01) | |

(52) U.S. Cl.
CPC . B32B 7/06 (2013.01); B32B 27/32 (2013.01); *Y10T 428/1352* (2015.01); *Y10T 428/2495* (2015.01)

(58) Field of Classification Search
CPC .......... B32B 7/06; B32B 27/08; B32B 27/32; Y10T 428/1352; Y10T 428/2495; Y10T 428/24967; Y10T 428/2826; Y10T 428/2848
USPC .......... 428/511–520, 355, 447, 910, 41, 349, 428/213, 328
See application file for complete search history.

(56) References Cited

U.S. PATENT DOCUMENTS

| | | | |
|---|---|---|---|
| 395,243 A | 12/1888 | Maggi | |
| 751,047 A | 2/1904 | Bircher | |
| 2,605,897 A | 8/1952 | Rundle | |
| 2,752,037 A | 6/1956 | Vogt | |
| 3,047,140 A | 7/1962 | Robins | |
| 3,770,122 A * | 11/1973 | Thiele ............. | 206/484 |
| D242,465 S | 11/1976 | Heldecker | |
| 4,011,190 A | 3/1977 | Telkes | |
| 4,157,784 A | 6/1979 | Grottrup et al. | |
| D266,224 S | 9/1982 | Bronander, Jr. | |
| 4,426,465 A | 1/1984 | Maki et al. | |
| D276,566 S | 11/1984 | Yoshizawa | |
| D276,567 S | 11/1984 | Yoshizawa | |
| 4,565,738 A | 1/1986 | Purdy | |
| 4,720,423 A | 1/1988 | Fraser | |
| 4,836,438 A | 6/1989 | Rigby | |
| 4,927,180 A | 5/1990 | Trundle et al. | |
| 4,972,948 A | 11/1990 | Saiki et al. | |
| 5,037,870 A | 8/1991 | Gugumus | |
| 5,154,284 A | 10/1992 | Starkey | |
| 5,174,492 A | 12/1992 | Gero | |
| 5,180,762 A | 1/1993 | Canova | |
| D339,063 S | 9/1993 | Simon | |
| 5,249,676 A | 10/1993 | Ashcraft et al. | |
| 5,358,792 A | 10/1994 | Mehta et al. | |
| 5,443,915 A | 8/1995 | Wilkie et al. | |
| 5,482,571 A | 1/1996 | Yamada | |
| 5,482,780 A | 1/1996 | Wilkie et al. | |
| 5,500,265 A | 3/1996 | Ambroise et al. | |
| 5,643,676 A | 7/1997 | Dobashi et al. | |
| 5,716,698 A | 2/1998 | Schreck et al. | |
| 5,730,354 A | 3/1998 | O'Connor | |
| 5,773,136 A * | 6/1998 | Alder et al. ................. | 428/317.3 |
| 5,807,625 A | 9/1998 | Amon et al. | |
| 5,924,571 A | 7/1999 | Cornelissen | |
| 5,948,836 A | 9/1999 | Bonora | |
| D427,369 S | 6/2000 | Bowen et al. | |

(Continued)

FOREIGN PATENT DOCUMENTS

| | | |
|---|---|---|
| DE | A-296 22 554 | 7/1997 |
| EP | 0099335 A1 | 1/1984 |

(Continued)

OTHER PUBLICATIONS

International Search Report for Application No. GB0709974.0 dated Oct. 16, 2007.
International Preliminary Report on Patentability in PCT Application No. PCT/GB2008/050369 dated Dec. 3, 2009 in 7 pages.
International Preliminary Report on Patentability in PCT Application No. PCT/GB2008/050595 dated Feb. 4, 2010 in 8 pages.
International Preliminary Report on Patentability in PCT Application No. PCT/GB2008/050596 dated Feb. 4, 2010 in 8 pages.
International Search Report and Written Opinion in PCT Application No. PCT/GB2008/050369 dated Sep. 4, 2008 in 10 pages.
International Search Report and Written Opinion in PCT Application No. PCT/GB2008/050595 dated Nov. 27, 2008 in 12 pages.
International Search Report and Written Opinion in PCT Application No. PCT/GB2008/050596 dated Jan. 28, 2009 in 12 pages.

(Continued)

*Primary Examiner* — Gwendolyn Blackwell
*Assistant Examiner* — Lee Sanderson
(74) *Attorney, Agent, or Firm* — Knobbe, Martens, Olson & Bear, LLP

(57) ABSTRACT

A sealable and peelable film comprising a four layer coextrudate comprising a core layer contributing predominantly towards the thickness of the film, a first sealing layer provided on one side of the core layer and a second sealing layer, or alternatively a laminating layer, provided on the other side of the core layer, and the film comprising a peeling layer in between the first sealing layer and the core layer and/or in between the second sealing layer, or alternatively the laminating layer, and the core layer, and wherein the peeling layer is adjacent the first sealing layer and/or the second sealing layer and/or the laminating layer, and wherein the relative thickness of the peeling layer and its adjacent sealing and/or lamination layer (p:s/l ratio) is from 1:10 to 5:1.

14 Claims, No Drawings

(56) References Cited

U.S. PATENT DOCUMENTS

| | | |
|---|---|---|
| 6,117,438 A | 9/2000 | Topolkaraev et al. |
| 6,168,075 B1 | 1/2001 | Sagel |
| 6,223,895 B1 | 5/2001 | Bowen et al. |
| 6,231,975 B1 | 5/2001 | Kong et al. |
| 6,244,017 B1 | 6/2001 | Focke et al. |
| 6,248,442 B1 | 6/2001 | Kong et al. |
| D453,681 S | 2/2002 | Kursner |
| 6,451,426 B2 | 9/2002 | Kong et al. |
| 6,491,161 B1 | 12/2002 | Focke et al. |
| 6,511,728 B1 | 1/2003 | Bakos et al. |
| D491,313 S | 6/2004 | Schrott |
| 6,773,797 B1 | 8/2004 | Wang et al. |
| 6,815,482 B1 | 11/2004 | Hirn et al. |
| 6,916,867 B2 | 7/2005 | Gugumus |
| D541,471 S | 4/2007 | Mitten et al. |
| 7,207,155 B2 | 4/2007 | Draghetti et al. |
| D561,933 S | 2/2008 | Mitten et al. |
| 7,377,384 B2 | 5/2008 | Mitten et al. |
| D592,525 S | 5/2009 | Maude et al. |
| D592,526 S | 5/2009 | Maude et al. |
| D594,742 S | 6/2009 | Meier et al. |
| D601,435 S | 10/2009 | Fell et al. |
| D613,182 S | 4/2010 | Fell et al. |
| D619,477 S | 7/2010 | Frizell et al. |
| 2001/0031371 A1 | 10/2001 | Kong et al. |
| 2003/0047469 A1 | 3/2003 | Draghetti et al. |
| 2003/0134159 A1* | 7/2003 | Peet ................................ 429/9 |
| 2003/0203231 A1 | 10/2003 | Stopper et al. |
| 2003/0226978 A1 | 12/2003 | Ribi et al. |
| 2004/0115457 A1 | 6/2004 | Kong |
| 2004/0115458 A1 | 6/2004 | Kong |
| 2004/0166323 A1 | 8/2004 | Wang |
| 2005/0150786 A1 | 7/2005 | Mitten et al. |
| 2005/0197481 A1 | 9/2005 | Temple et al. |
| 2005/0230960 A1 | 10/2005 | Bilodeau |
| 2006/0023327 A1 | 2/2006 | Coombs et al. |
| 2006/0040091 A1 | 2/2006 | Bletsos et al. |
| 2006/0278543 A1 | 12/2006 | Pham |
| 2007/0037465 A1 | 2/2007 | Nutz et al. |
| 2007/0221526 A1 | 9/2007 | Kikuchi |
| 2007/0228040 A1 | 10/2007 | Boriani et al. |
| 2007/0241002 A1 | 10/2007 | Wu et al. |
| 2010/0155292 A1 | 6/2010 | Fell et al. |
| 2010/0173145 A1 | 7/2010 | Marshall et al. |
| 2010/0237603 A1 | 9/2010 | Waning et al. |
| 2010/0247898 A1 | 9/2010 | Denecker |
| 2012/0318703 A1 | 12/2012 | Fell et al. |

FOREIGN PATENT DOCUMENTS

| | | |
|---|---|---|
| EP | 0290386 A2 | 11/1988 |
| EP | 0468923 A2 | 1/1992 |
| EP | 0 746 468 | 4/1996 |
| EP | 1004626 B1 | 5/2003 |
| EP | 1316419 A2 | 6/2003 |
| EP | 1413599 A1 | 4/2004 |
| EP | 1714778 A1 | 10/2006 |
| EP | 1749655 A1 | 2/2007 |
| GB | 2236466 A | 4/1991 |
| GB | 2243578 A | 11/1991 |
| GB | 2349151 A | 10/2000 |
| GB | 2354245 A | 3/2001 |
| JP | 06297630 A | 10/1994 |
| WO | WO 90/06539 A | 6/1990 |
| WO | WO 96/04178 | 2/1996 |
| WO | WO 96/20085 | 7/1996 |
| WO | WO 98/22291 | 5/1998 |
| WO | WO 98/29311 | 7/1998 |
| WO | WO 98/32596 | 7/1998 |
| WO | WO 00/78545 | 12/2000 |
| WO | WO 02/100637 | 12/2002 |
| WO | WO 03/047857 | 6/2003 |
| WO | WO 2004/087795 A1 | 10/2004 |
| WO | WO 2005/072959 | 8/2005 |

OTHER PUBLICATIONS

Search Report in GB 0714418.1 dated Oct. 31, 2007 in 1 page.
Search Report in GB 0714419.9 dated Oct. 5, 2007 in 2 pages.
U.S. Appl. No. 12/352,478, filed Jan. 12, 2009, Fell et al.
U.S. Appl. No. 29/333,756, filed Mar. 13, 2009, Fell et al.
U.S. Appl. No. 29/333,763, filed Mar. 13, 2009, Frizell et al.
U.S. Appl. No. 12/601,246, filed Nov. 20, 2009, Marshall et al.
International Preliminary Report on Patentability in PCT Application No. PCT/GB2008/050320 (the PCT counterpart of this application) dated Nov. 19, 2009 in 7 pages.
International Search Report and Written Opinion in PCT Application No. PCT/GB2008/050320 dated Sep. 23, 2009 in 10 pages.
U.S. Appl. No. 12/670,356, filed Jan. 22, 2010, Denecker.
U.S. Appl. No. 12/670,374, filed Jan. 22, 2010, Waning et al.
International Search Report for Application No. GB0708692.9 dated Oct. 23, 2007.

* cited by examiner

SEALABLE, PEELABLE FILM

This application is a U.S. National Phase under 35 U.S.C. §371 of International Application No. PCT/GB2008/050320, filed on May 2, 2008 and published in English on Nov. 13, 2008, which claims foreign priority from GB 0708692.9 filed on May 4, 2007, each of which are incorporated herein by reference in their entirety.

The present invention relates to a sealable, peelable film and to a manufacturing method for such a film.

WO-A-96/04178 discloses a peelable film comprising a core layer comprising an olefin polymer and a heat-sealable layer comprising a blend of low density polyethylene (LDPE) and a material incompatible with the LDPE, such as an olefin polymer or a co- or terpolymer of ethylene, propylene or butylene. The film structure can be heat-sealed to a plastic container to form the lid of the container, or to itself to form a package.

US2001/0031371 describes a sealable film comprising an inner layer comprising olefin polymer; a sealing layer; and a separable layer positioned between the inner layer and the sealing layer, the separable layer comprising (1) ethylene-propylene block copolymer or (2) a blend of polyethylene and another olefin which is incompatible with the polyethylene, specifically either (i) polypropylene homopolymer or (ii) ethylene-propylene block copolymer. Methods of making the sealable film are described.

WO96/20085 refers to a multilayer polymeric film comprising a base layer of a propylene polymer, a non-voided intermediate layer on the base layer, and a heat sealable polymer layer on the intermediate layer, the non-voided intermediate layer having an internal cohesive strength less than the bond strength of the intermediate layer to either the base layer or the heat sealable layer and less than the internal cohesive strengths of either the base layer or the heat sealable layer. Such films enable peelable seals to be formed by rupture of the intermediate layer due to its lower internal cohesive strength compared with the core layer or the heat seal layer.

U.S. Pat. No. 4,565,738 describes a composition multiple-layer film, suitable as packaging film, having a base layer of a propylene polymer and at least one surface layer formed from a blend of a propylene-ethylene block copolymer and an ethylene-higher olefin random copolymer. The composite film is preferably coextruded and is suitable as a substrate for additional polymeric layer(s), such as heat-sealable coatings, which may be adhered to the substrate by a polymeric primer resin.

EP-A-746468 describes a multi layer film which peels by rupture within what is referred to in the specification as an intermediate layer between a base layer and a heat sealable layer. The intermediate layer is said to comprise preferably a blend of polymers which do not co-crystallise.

U.S. Pat. No. 6,451,426 discloses an oriented sealable film comprising an inner layer of an olefin polymer, a sealing copolymer layer, and a separable layer comprising a block copolymer positioned between the inner layer and the sealing layer.

U.S. Pat. No. 5,443,915 discloses an oriented polyolefin film having a white-opaque cold seal-receptive skin layer on one side of a core layer and a vacuum deposited metal layer on the other side of the core layer.

U.S. Pat. No. 5,358,792 discloses a heat-sealable composition comprising (a) from about 30 to about 70 wt % of a low-melting polymer comprising a very low density ethylene-based copolymer defined by a density in the range of about 0.88 g/cm³ to about 0.915 g/cm³, a melt index in the range of about 1.5 dg/min to about 7.5 dg/min, a molecular weight distribution ($M_w/M_n$) no greater than about 3.5 and (b) from about 70 to about 30 wt % of a propylene-based polymer.

U.S. Pat. No. 5,482,780 discloses an oriented polymeric α-olefin film having: an isotactic propylene homopolymer core; a cold seal release skin layer adherent to one side of the core; and a surface treated cold seal receptive layer or such treated layer with a cold seal cohesive composition over the surface treatment of said layer on the other side of the core. The cold seal release skin layer comprises a slip agent and a blend of two polymers, namely, an ethylene-propylene random copolymer containing about 2% to 8% of ethylene in such copolymer and an ethylene-butylene copolymer containing about 0.5% to 6% of ethylene in such copolymer. The cold seal receptive layer is of an ethylene-propylene random copolymer containing about 2 to 8% of ethylene.

U.S. Pat. No. 5,500,265 discloses a peelable film comprising (a) a core layer comprising an olefin polymer, (b) a skin layer on at least one surface of the core layer, the skin layer comprising: a blend of a butylene polymer with another olefin polymer or a polymer of butylene and at least one other olefin, and (c) a coating layer on the skin layer.

U.S. Pat. No. 5,716,698 relates to a peelable, oriented, opaque, multilayer polyolefin film comprising at least one opaque layer and a peelable top layer.

U.S. Pat. No. 6,248,442 relates to multilayer films that are heat-sealable over a broad temperature range. The '442 patent also relates to multilayer films that provide easy-opening and hermetic seals to packages. The films of the '442 patent are made up of a core layer comprising linear low density polyethylene (LLDPE) and at least one skin layer having a melting point of at least 10° C. below the core layer melting point.

U.S. Pat. No. 5,997,968 discloses a multilayer polyolefin film comprising at least three coextruded layers comprising an opaque base layer, an intermediate layer, and an outer peelable surface layer composed of two incompatible polyolefins, wherein the intermediate layer contains at least 80% by weight of a polyolefin having a lower melting point or lower glass transition temperature than the polyolefin forming the base layer.

U.S. Pat. No. 6,231,975 discloses a sealable film comprising an inner layer of any olefin polymer, a sealing layer and a separable layer positioned there between. The separable layer comprises an ethylene-propylene copolymer or a blend of polyethylene and another olefin, which forms an incompatible mixture or blend.

US2003/0134159 A1 discloses a sealable film comprising a core layer of an olefin polymer and a separable layer exterior to the core layer, and also an optic improving layer and a sealing layer, wherein the optic improving layer is in between the separable layer and the sealing layer.

US2004/0115457 A1 and US2004/0115458 A1 both describe sealable, peelable films having a relatively thick peelable core layer.

Openable pouches are disclosed in WO 00/78545.

Another type of peelable seal is described in our co-pending United Kingdom patent application 0514785.5.

There is on ongoing need for improved products in the field of sealable and peelable film structures. In particular, a need still exists for a film structure that has a sealable outer layer that seals well to itself or other surfaces over a broad temperature and/or pressure range and which is able to peel within one layer of a multi-layer film, and yet which maintains acceptable characteristics for the film's end use in terms of at least one of gloss, haze, opacity, printability and COF. In particular there is a need for peelable films which can be readily opened without creating a "z-direction" tear. In stretched polyolefin films, in particular biaxially orientated polypropylene films, the mechanical strength of seal seams is often higher than that of the film itself, and therefore when a sealed pack is opened is not only the seal seam which is broken apart. Typically, a tear propagates in an uncontrolled manner through the entire film upon opening. Peelable films are films which once sealed can be separated again mechanically without damaging or destroying the film itself. Peelable seal layers are typically required to have good sealing properties and also permit controlled opening of a bag or package. A peelable heat sealable film can be formed when a coated film is formed by coating a biaxially oriented polypropylene film formed as a multi layer film with a core of a homopolymer of polypropylene with a skin layer formed on each side or major surface of the core with a heat sealable coating. Such skin layers may be formed from copolymers such as copolymers of propylene and ethylene including block copolymer. The skin layer formed as a melt coat during the production of the film is believed to give a peeling seal when coated by virtue of incompatible phases in the melt coat. This limits the plain of failure to the melt coat itself, away from the core layer avoiding any possibility of a tearing seal in the core. The result is that the seal is weaker than a conventional seal but gives the same seal strength throughout the pool, and doesn't tear.

A z-direction tear disrupts the integrity of a multilayer film when the film is pulled apart at the seal. A film with a z-direction tear has not simply separated at the seal line. Instead, the separation, or tear, has extended to other layers of the film. It is difficult to properly reclose a package that has a z-direction tear, thereby hampering the ability of the package to maintain the freshness or integrity of its contents. When z-direction tears can be eliminated, packages are easily refolded and sealed by simple mechanical means, such as a clip or adhesive label It is an object of the invention to provide a sealable polymer film having peelability. It is another object of the invention to provide a thermoplastic film structure with a sealable outer layer that seals well over a broad temperature range. A further object of the invention is to provide a thermoplastic film structure with a sealable outer layer that, when sealed, can be readily opened without creating a z-direction tear. Another object of the invention is to provide such films with satisfactory optics and hot tack performance. It is a further object of the invention to provide such as films for wrapping and peelably sealing articles or products.

According to the present invention there is provided a sealable and peelable film comprising a four layer coextrudate comprising a core layer contributing predominantly towards the thickness of the film, a first sealing layer provided on one side of the core layer and a second sealing layer, or alternatively a laminating layer, provided on the other side of the core layer, and the film comprising a peeling layer in between the first sealing layer and the core layer and/or in between the second sealing layer, or alternatively the laminating layer, and the core layer, and wherein the peeling layer is adjacent the first sealing layer and/or the second sealing layer and/or the laminating layer, and wherein the relative thickness of the peeling layer and its adjacent sealing and/or lamination layer (p:s/l ratio) is from 1:10 to 5:1.

In the case where the film of the invention is to be manufactured as a single web, the four layer construction comprises a first sealing layer provided on one side of the core layer and a second sealing layer provided on the other side of the core layer, with the peeling layer being provided between the core layer and at least one of the sealing layers, and adjacent at least one of the sealing layers.

In the case where the film of the invention is to be manufactured as a laminate, the four layer construction comprises a first sealing layer provided on one side of the core layer and a laminating layer provided on the other side of the core layer, two single webs of the film being laminated to each other (laminating layer to laminating layer) to provide a seven layer laminate structure (the two laminating layers effectively forming a single layer in the laminate structure), with the peeling layer being provided between the core layer and the first sealing layer and/or the lamination layer, and adjacent the first sealing layer and/or the lamination layer.

The film of the invention necessarily comprises the four layer construction or laminated seven layer construction described above, but may also include further or additional layer(s) whether by coextrusion, coating or lamination. Thus, sealable and peelable film structures according to the present invention may also include one or more intermediate layers positioned between the core layer and the first sealing layer, between the core layer and the second sealing layer, between the core layer and the laminating layer, between the core layer and the peeling layer, as the case may be.

In the films of the invention, the peeling layer is shielded from contact with the external environment at its major surface at least by the adjacent sealing and/or laminating layer thereon and that the effectiveness of the peeling layer is thereby improved and/or maintainable over a longer period of use of the film in its end application.

The peeling layer preferably comprises at least one block copolymeric component.

The block copolymeric component in the peeling layer preferably comprises at least one olefinic component. More preferably, at least two olefinic components are present, the block copolymer being at least partially formed by the block copolymerisation of one olefinic component, or mixture of olefinic components, with another olefinic component, or mixture of olefinic components. For example, the block copolymeric substrate may comprise polypropylene and polyethylene.

In one embodiment of the invention the peeling layer is composed entirely of the block copolymeric component. In an alternative embodiment the block copolymeric substrate may be blended with one or more other suitable materials to form the peeling layer, provided that the peeling layer retains its peelable characteristic. The film peeling layer may therefore comprise a blend of the block copolymeric substrate with another polymeric material, for example polyethylene, polypropylene, mixtures thereof, and/or other known polyolefins.

The peelable, sealable films of the invention can be provided with satisfactory optics and can be obtained in a multilayer film in which a block copolymeric component is provided in the peeling layer. The films of the invention preferably have wide angle haze values of less than about 5, more preferably less than about 4 and most preferably less than about 3. The films of the invention preferably have a gloss value (at 45°) of at least about 75, more preferably at least about 80, still more preferably at least about 85 and most preferably at least about 90. Without wishing to be bound by the theory, it is believed that one or more satisfactory optical properties of the film can be maintained by ensuring that the peeling layer is relatively thin—i.e. by controlling the p:s/l ratio.

The sealing layer(s) may be inherently sealable, or may be coated with a sealable coating.

By "sealable" is meant heat sealable, cold sealable, pressure sealable, or any suitable combination thereof. For most applications, heat sealable films will be used.

The substrate or core layer contributes predominantly towards the thickness of the film, by which is preferably meant the (or each combined) substrate or core layer is the thickest single layer in the film, more preferably that the thickness of the (or each combined) substrate or core layer is thicker than the other layers of the film in combination. Preferably the (or each combined) substrate or core layer comprises over 90%, more preferably over 95%, still more preferably over 97.5% of the total film thickness.

Preferably the peeling layer is adjacent the core layer of the film. Preferably this means there are no intervening layers between the peeling layer and the core layer.

The peeling layer is adjacent the first sealing layer of the film, or the second sealing layer of the film, or the laminating layer of the film, as the case may be. Preferably this means there are no intervening layers between the peeling layer and the first sealing layer (if adjacent thereto) or that there are no intervening layers between the peeling layer and the second sealing layer (if adjacent thereto) or that there are no intervening layers between the peeling layer and the lamination layer of the film (if adjacent thereto), as the case may be.

The relative thickness of the peeling layer and its adjacent sealing and/or lamination layer (p:s/l) may be selected with reference to the end use of the film. In an intended form-fill-seal bag-making application and in other applications of this film the p:s/l ratio is from about 1:10 to about 5:1, preferably from about 1:8 to about 3:1, more preferably from about 1:6 to about 2:1, and more preferably from about 1:4 to about 1:1.

The thickness of the peeling layer may be selected to provide a peel strength (when measured at a heat seal threshold at 15 psi/2 secs at a temperature of from 110° C. to 140° C.) of less than about 750 g/25 mm$^2$, preferably less than about 650 g/25 mm$^2$, more preferably less than about 600 g/25 mm$^2$ and most preferably less than about 550 g/25 mm$^2$.

The thickness of the peeling layer may be selected to provide a peel strength (when measured at a heat seal threshold at 5 psi/0.5 secs at a temperature of from 110° C. to 140° C.) of less than about 650 g/25 mm$^2$, preferably less than about 600 g/25 mm$^2$, more preferably less than about 550 g/25 mm$^2$ and most preferably less than about 500 g/25 mm$^2$.

The thickness of the peeling layer is selected to be thick enough to provide a consistent peel, but thin enough to provide the film with good optical properties. Preferably the thickness of the peeling layer is from 0.3 μm to 3 μm, more preferably from 0.35 μm to 2.5 μm, still more preferably from 0.4 μm to 2.0 μm, and most preferably from 0.5 μm to 1.5 μm.

The film core layer may comprise a polyolefin film, for example polyethylene, polypropylene, mixtures thereof, and/or other known polyolefins. The polymeric film can be made by any process known in the art, including, but not limited to, cast sheet, cast film and blown film. The film core layer may be of monolayer or of multi-layer construction. This invention may be particularly applicable to films comprising cavitated or non-cavitated polypropylene films, with a polypropylene core and skin layers (sealing and/or laminating layers) with a thickness substantially below that of the core layer and formed for example from co-polymers of ethylene and propylene or terpolymers of propylene, ethylene and butylene. The film may comprise a biaxially orientated polypropylene (BOPP) film, which may be prepared as balanced films using substantially equal machine direction and transverse direction stretch ratios, or can be unbalanced, where the film is significantly more orientated in one direction (MD or TD). Sequential stretching can be used, in which heated rollers effect stretching of the film in the machine direction and a stenter oven is thereafter used to effect stretching in the transverse direction. Alternatively, simultaneous stretching, for example, using the so-called bubble process, or simultaneous draw stenter stretching may be used.

Alternatively, the film core layer may comprise a polyester film, a polyamide film, or an acetate film, for example.

The core layer may be non-cavitated, or may be cavitated if an opaque film is desired.

One advantage of the present sealable and peelable films is that peelability is provided in the peeling layer, allowing the manufacturer freedom to adapt the core layer(s) and/or skin layer(s) and/or intermediate layer(s) and/or coating(s) to meet manufacturing requirements of, for example, gloss, haze, opacity, printability, COF, etc.

The films of the invention will commonly find application in the packaging of articles of commerce, for example in reamwrap, overwrap and other types of packaging.

According to the present invention there is a provided a sealed package formed from a sealable and peelable film comprising a four layer coextrudate comprising a core layer contributing predominantly towards the thickness of the film, a first sealing layer provided on one side of the core layer and a second sealing layer, or alternatively a laminating layer, provided on the other side of the core layer, and the film comprising a peeling layer in between the first sealing layer and the core layer and/or in between the second sealing layer, or alternatively the laminating layer, and the core layer, and wherein the peeling layer is adjacent the first sealing layer and/or the second sealing layer and/or the laminating layer, and wherein the relative thickness of the peeling layer and its adjacent sealing and/or lamination layer (p:s/l ratio) is from 1:10 to 5:1, the package being formed by wrapping the film around an article to be packaged in a manner to obtain at least one region of film overlap, and heat sealing the resulting overlapped film sections to each other to provide at least one sealed region of the package, the sealed region being subsequently openable by manually separating the overlapped film sections, effective without substantial tearing of the film at or around the sealed region.

Without wishing to be bound by the theory, it seems likely that the block copolymeric peeling layer provides the desired peelability by allowing the heat sealed film to peel away from its overlapped neighbour by peeling off within the block copolymeric peeling layer of the film.

Preferably, the polymer film is a multilayer film comprising the core layer, the block copolymeric peeling layer and two skin layers of a different material from the peeling layer. The skin layers (the sealing and/or laminating layers) may comprise a polymeric material, and may comprise homopolymeric and/or copolymeric materials, and may be a blend of two or more such materials. The skin layer may comprise a non-block copolymeric structure, for example a random copolymeric structure, a homopolymeric structure or a suitable blend of materials. The skin layers are be provided on the substrate by coextrusion.

The presence of a skin layers may assist in the realisation of the invention in its more preferred aspects because peeling initiated in the peeling layer, between two block copolymeric components for example, may be prevented or hindered from propagating beyond the peeling layer. Propagation of the peel through the skin layers of the film may give rise to a tearing film rather than a peelable film.

Accordingly, the invention provides in one of its preferred aspects a sealed package formed from a sealable and peelable film comprising a four layer coextrudate comprising a core layer contributing predominantly towards the thickness of the film, a first sealing layer provided on one side of the core layer and a second sealing layer, or alternatively a laminating layer, provided on the other side of the core layer, and the film comprising a peeling layer in between the first sealing layer and the core layer and/or in between the second sealing layer, or alternatively the laminating layer, and the core layer, and wherein the peeling layer is adjacent the first sealing layer and/or the second sealing layer and/or the laminating layer, and wherein the relative thickness of the peeling layer and its adjacent sealing and/or lamination layer (p:s/l ratio) is from 1:10 to 5:1, the package being formed by wrapping the film around an article to be packaged in a manner to obtain at least one region of film overlap, and sealing the resulting overlapped film sections to each other to provide at least one sealed region of the package, the sealed region being subsequently openable by manually separating the overlapped film sections, effective without substantial tearing of the film at or around the sealed region.

Preferably the sealable material and/or the sealable coating is a heat sealable material and the overlapped film sections are sealed to each other by heat sealing.

The sealed package of the invention is preferably formed by severing a sheet of the polymeric film from a web of the film and wrapping the severed polymeric film sheet around an article to form a film tube with wrapped ends overlapping and sealing the overlapped ends to form a girth seal. Preferably the tube is then closed at each end and sealed to form an envelope or parcel seal.

One particular application of the film and sealed packages of the invention is in ream wrap. Another application is in overwrap. Other packaging applications can be envisaged.

In the case of reamwrap, reams of cut paper for copy machines, computers, printers and other applications are most commonly packaged for shipping, storage and retail sale in ream wrappers made of various wrap materials. These wrap materials have traditionally been paper, plastic film, or a paper/plastic film laminate.

The wrap materials protect the wrapped paper product from physical damage and moisture pick up during shippage and storage. The wrap materials also protect the wrapped product from physical damage during repeated handling and stocking on retail shelves.

The distribution of reams of papers has changed from boxes for larger users to wrapped reams for sale in individual packages containing e.g. 500 sheets. Such distribution of reams of papers has placed increasing demands on the wrapper due to more frequent handling of the individual reams. Increased handling of the reams has resulted in more reams breaking open, damaging the wrapped paper product by allowing to pick up moisture, tear or get minor curl—physical damage that ultimately results in jams in the end—user's printer or copy machine. However the resultant ability of a package to avoid damage arising from handling means that the packaged product is more difficult to open.

One way of overcoming this problem would be to provide sealing means that possess a mechanical resistance sufficient to maintain the seal intact during storage and transport until such time as the packaging or wrapping is to be opened but the package remains capable of being opened manually at or near the seal without risk of damaging the wrapped paper product.

The invention is particularly applicable in the field of ream wrap technology. Thus, according to the invention there is provided a sealed ream wrap package in which the packaged article is a stack of paper.

Also provided in accordance with the present invention is a sealed package comprising polymer film in accordance with the above printed on its skin layer with at least one ink.

The film core or the skin layers of the film may comprise additional materials such as anti-block additives, opacifiers, fillers, UV absorbers, cross-linkers, colourants, waxes and the like.

The film of the invention may be further treated, by corona discharge treating for example, further to improve ink receptivity of the film or of the skin layer of the film.

The films used in accordance with the present invention can be of a variety of thicknesses according to the application requirements. For example they can be from about 10 to about 240 µm thick and preferably from about 15 to about 90 µm thick.

In a multi-layer film in accordance with the invention at least one of the skin layers is preferably ink printable.

The hot tack properties of the film are found to be dependent at least to some extent on the thickness of the skin layers, in particular the thickness of the sealing layer (generally the first sealing layer) which lies adjacent the peeling layer. The skin layers preferably have a thickness of from about 0.2 µm to about 3 µm, preferably from about 0.3 µm to about 2.5 µm, more preferably from about 0.5 µm to about 2.0 µm, most preferably from about 1.0 µm to about 2.0 µm. In some cases the thickness of the sealing layer adjacent the peeling layer may be greater than the thickness of a sealing or lamination layer which is not adjacent the peeling layer.

In some embodiments of the invention it may be desirable to provide the film with a functional and/or aesthetic coating.

In a preferred embodiment of the invention, the film is provided on at least one sealing layer with a printable coating.

The coated film of the invention is suitably manufactured by means of a coating dispersion applied to a film substrate. The dispersion used to coat the substrate should contain about 15-70% solids, preferably 20-60% solids, more preferably 25 to 50% solids, in order to achieve satisfactory film forming properties. The film formed should be uniform and continuous.

The dispersion may be coated onto the surface of the chosen web and dried using any suitable conventional technique. The coating composition of the invention can be applied by any other number of well known techniques, such as dip coating, rod coating, blade coating, air knife coating, gravure coating and reverse roll coating, extrusion coating, slide coating, curtain coating, and the like. After coating, the layer is generally dried by simple evaporation, which may be accelerated by known techniques such as convection heating. The dispersion is preferably applied using a gravure process, and the drying step carried out in an oven. The drying of the coated dispersion removes water from the dispersion leaving a uniform continuous film with any non-film forming particles dispersed in the film.

The coating is preferably an acrylic coating.

The film of the invention may also incorporate one or more functional and/or aesthetic additives. Suitable additives may be selected from one or more of the following, mixtures thereof and/or combinations thereof: UV absorbers, dyes; pigments, colorants, metallised and/or pseudo-metallised coatings; lubricants, anti-static agents (cationic, anionic and/or non-ionic, e.g. poly-(oxyethylene) sorbitan monooleate), anti-oxidants (e.g. phosphorous acid, tris (2,4-di-tert-butyl phenyl) ester), surface-active agents, stiffening aids, slip aids (for example hot slips aids or cold slip aids which improve the ability of a film to slide satisfactorily across surfaces at about room temperature, e.g. micro-crystalline wax; gloss improvers, prodegradants, barrier coatings to alter the gas and/or moisture permeability properties of the film (such as polyvinylidene halides, e.g. PVdC); anti-blocking aids (for example microcrystalline wax, e.g. with an average particle size from about 0.1 to about 0.6 μm); tack reducing additives (e.g. fumed silica, silica, silicone gum); particulate materials (e.g. talc); additives to increase COF (e.g. silicon carbide); additives to improve ink adhesion and/or printability, additives to increase stiffness (e.g. hydrocarbon resin); additives to increase shrinkage (e.g. hard resin)

Some or all of the additives listed above may be added together as a composition to coat the films of the present invention and/or form a new layer which may itself be coated and/or may form the outer or surface layer of the sheet. Alternatively, some or all of the preceding additives may be added separately and/or incorporated directly into the bulk of the core layer optionally during film formation (e.g. as part of the original polymer composition), and thus they may or may not form layers or coatings as such.

The invention will now be more particularly described with reference to the following examples.

EXAMPLES 1 TO 3

Preparation of Film

A four layer polymeric tube was formed by coextruding a core layer (of polypropylene homopolymer with two layers of polyethylene/polypropylene/polybutylene terpolymer (a random copolymer) as skin layers (first and second sealing layers) on opposite sides of the core layer, and with a peeling layer of a polypropylene-polyethylene block copolymer (available under the designation PPC 5660 from Total Petrochemicals) provided between the core layer and the first sealing layer. The tube was cooled and subsequently reheated before being blown to produce a four layer biaxially oriented film tube. The film tube was then nipped and spliced to form a single web film.

Initially, three 30 μm films were produced in this way, the layer characteristics of the film being provided in Table 1:

TABLE 1

| Example | Film Thickness/μm | Layer Thicknesses/μm | | | |
|---|---|---|---|---|---|
| | | First Sealing (PP/PE/PB) | Peeling (BCP) | Core (PP) | Second Sealing (PP/PE/PB) |
| 1 | 30 | 1.5 | 0.5 | 26.5 | 1.5 |
| 2 | 30 | 1 | 1 | 26.5 | 1.5 |
| 3 | 30 | 0.5 | 1.5 | 26.5 | 1.5 |

The films were sealed (first sealing layer to first sealing layer) and the peel strength of these films was then measured at a range of sealing temperatures and the results are shown in Table 2. The Heat seal threshold was set at 15 psi/2 secs.

TABLE 2

| Temperature (° C.) | Heat Seal/peel Strength (g/25 mm²) | | |
|---|---|---|---|
| | Example 1 | Example 2 | Example 3 |
| 110 | 28 | 32 | 36 |
| 115 | 153 | 148 | 168 |
| 120 | 309 | 383 | 369 |
| 125 | 434 | 502 | 440 |
| 130 | 416 | 438 | 444 |
| 135 | 337 | 405 | 425 |
| 140 | 313 | 391 | 414 |

The optical properties of these films were also measured, and the results shown in Table 3:

TABLE 3

| Sample | WAH | Gloss 45° |
|---|---|---|
| 1 | 3.5 | 87 |
| 2 | 2.4 | 91 |
| 3 | 3 | 88 |

The hot tack properties of these films were also measured using a spring method applied directly to the film after sealing, and the results shown in Table 4, the results indicating % age seal area opening:

TABLE 4

| | 60 g spring/15 psi/ 2 sec/130° C. | | | | 90 g spring/15 psi/2 sec/130° C. | | | |
|---|---|---|---|---|---|---|---|---|
| Sample | 1 | 2 | 3 | Avg | 1 | 2 | 3 | Avg |
| 1 | 4 | 4 | 4 | 4 | 4 | 8 | 4 | 5 |
| 2 | 4 | 4 | 4 | 4 | 56 | 100 | 56 | 71 |
| 3 | 10 | 8 | 10 | 9 | 40 | 40 | 40 | 40 |

The peel/seal strengths, although all being slightly different, were all acceptable. The most noticeable difference between the samples was hot tack performance. It appeared that a lower coat weight BCP with a higher coat weight first sealing layer performed well throughout the various test conditions.

In certain end uses of the invention, hot tack performance may be especially important, for example in form-fill-seal bag making. Hot tack in this connection is a measure of how strong the seal is whilst still hot, and is intended to gauge whether or not the seal would break at the bottom of the bag whilst being filled from the top, which filling step is usually done while the seal is still hot.

EXAMPLES 4 TO 10

Preparation of Film

In Examples 4 to 8 a four layer polymeric tube was formed by coextruding a core layer of polypropylene homopolymer (formulated with a migratory slip agent) with two layers of polyethylene/polypropylene/polybutylene terpolymer (a random copolymer) as skin layers (first and second sealing layers) on opposite sides of the core layer, and with a peeling layer of a polypropylene-polyethylene block copolymer (available under the designation PPC 5660 from Total Petrochemicals) provided between the core layer and the first sealing layer. The tube was cooled and subsequently reheated before being blown to produce a four layer biaxially oriented film tube. The film tube was then nipped and spliced to form a single web film with four layers.

5 films were produced in this way, the layer characteristics of the film being provided in Table 5:

TABLE 5

| | Film Thickness/ μm | Layer Thicknesses/μm | | | |
|---|---|---|---|---|---|
| Example | | First Sealing (PP/PE/PB) | Peeling (BCP) | Core (PP) | Second Sealing (PP/PE/PB) |
| 4 (TG21A20) | 20 | 1.5 | 1.0 | 17.2 | 0.3 |
| 5 (TG32A30) | 30 | 1.5 | 1.0 | 27.2 | 0.3 |
| 6 (TG21D30, 0.5 μm) | 30 | 1.5 | 0.5 | 27.7 | 0.3 |
| 7 (TG21D30, 1 μm) | 30 | 1.5 | 1.0 | 27.2 | 0.3 |

TABLE 5-continued

| | Film Thickness/ μm | Layer Thicknesses/μm | | | |
|---|---|---|---|---|---|
| Example | | First Sealing (PP/PE/PB) | Peeling (BCP) | Core (PP) | Second Sealing (PP/PE/PB) |
| 8 (TG21D30, 3 μm) | 30 | 1.5 | 3.0 | 26.2 | 0.3 |

Example 5 was a pigmented white film in which the pigment was added to the polypropylene core charge prior to extrusion. The pigment was TiO$_2$ R104 supplied by Dupont.

In Examples 9 and 10 a four layer polymeric tube was formed by coextruding a core layer of polypropylene homopolymer (formulated with a migratory slip agent) with a layer of polyethylene/polypropylene/polybutylene terpolymer (a random copolymer comprising polypropylene (92% w/w)/ethylene (4% w/w)/butylene-1 (4% w/w)) as a skin layer (first sealing layer) on one side of the core layer, and with a peeling layer of a polypropylene-polyethylene block copolymer (available under the designation PPC 5660 from Total Petrochemicals) provided between the core layer and the first sealing layer. On the other side of the core layer was provided a laminating layer polyethylene/polypropylene/polybutylene terpolymer (a random copolymer comprising polypropylene (82% w/w)/ethylene (1% w/w)/butylene-1 (17% w/w)). The tube was cooled and subsequently reheated before being blown to produce a four layer biaxially oriented film tube. The film tube was then nipped and laminated to itself (laminating layer to laminating layer) spliced to form a laminated film with seven layers.

5 films were produced in this way, the layer characteristics of the film being provided in Table 6:

TABLE 6

| Example | Film Thickness/ μm | Layer Thicknesses/μm | | | | | | |
|---|---|---|---|---|---|---|---|---|
| | | S1 | P1 | C1 | L | C2 | P2 | S2 |
| 9 (TG21B50) | 50 | 0.75 | 0.5 | 23.4 | 0.7 | 23.4 | 0.5 | 0.75 |
| 10 (TG21B58) | 58 | 0.75 | 0.5 | 27.4 | 0.7 | 27.4 | 0.5 | 0.75 |

S1 = First Sealing Layer (PP/PE/PB)
P1 = First Peeling Layer (BCP)
C1 = First Core Layer (PP)
L = Lamination Layer (PP/PE/PB)
C2 = Second Core Layer (PP)
P2 = Second Peeling Layer (BCP)
S2 = Second Sealing Layer (PP/PE/PB)

The peel strength of these films was then measured at a range of sealing temperatures and the results are shown in Table 7. The Heat seal threshold was set at 15 psi/2 secs.

TABLE 7

| | Average peel strength (g/25 mm$^2$) | | | | | | |
|---|---|---|---|---|---|---|---|
| | | | TG21D30 | | | | |
| Temp (° C.) | Example 4 TG21A20 | Example 5 TB32A30 | Example 6 0.5 μm | Example 7 1 μm | Example 8 3 μm | Example 9 TG21B50 | Example 10 TG21B58 |
| 115 | 194 | 90 | 109 | 109 | 94 | 192 | 174 |
| 120 | 323 | 349 | 319 | 331 | 243 | 297 | 518 |
| 125 | 362 | 519 | 384 | 527 | 344 | 300 | 575 |
| 130 | 291 | 436 | 377 | 496 | 422 | 324 | 542 |
| 135 | 306 | 402 | 368 | 454 | 449 | 296 | 560 |
| 140 | 320 | 417 | 358 | 482 | 483 | 342 | 546 |

Both the 30 micron white and clear films performed similarly with respect to peel strength giving peak seal strengths up to 500 g/25 mm$^2$. Optimum peel strengths were realised with the BCP peeling layer from 1 to 3 μm.

The Heat seal threshold/peelability 15 psi/secs (in/out) was measured for two of the films (Examples 5 and 7) and the results shown in Table 8:

TABLE 8

| Temp | Example 5 (TB32A30) | Example 7 (TG21D30) |
|---|---|---|
| 115 | 15 | 0 |
| 120 | 65 | 48 |
| 125 | Fail | Fail |
| 130 | Fail | Fail |

It became apparent that for the split sheet varieties in/out seals were inconsistent and would fail peels that were sealed over 125° C. However, if the intended end use of the film is in a form-fill-seal bag environment, the in-out peel strength is not determinative of the seal suitable—rather out-out peel strength is.

The Heat seal threshold/peelability (at 5 psi/0.5 secs (out/out)) was measured for three of the films (Examples 5, 7 and 9) and the results shown in Table 9:

TABLE 9

| | Average Peel strength (g/25 mm²) | | |
|---|---|---|---|
| Temp (° C.) | Example 5 (TB32A30) | Example 7 (TG21D30 (1 μm)) | Example 9 (TG21B50) |
| 115 | 0 | 0 | 0 |
| 120 | 0 | 109 | 0 |
| 125 | 38 | 206 | 69 |
| 130 | 234 | 337 | 235 |
| 135 | 405 | 530 | 263 |
| 140 | 496 | 476 | 267 |

The optical properties of these films were also measured, and the results shown in Table 10:

TABLE 10

| Grade | WAH | Gloss 45° |
|---|---|---|
| Example 4 (TG21A20) | 2.2 | 94 |
| Example 5 (TB32A30) | | 51 |
| Example 6 (TG21D30 (0.5 micron)) | 2 | 95 |
| Example 7 (TG21D30 (1 micron)) | 2.2 | 96 |
| Example 8 (TG21D30 (3 microns)) | 3.2 | 90 |
| Example 9 (TG21B50) | 2.9 | 92 |
| Example 10 (TG21B58) | 3.2 | 92 |

Analysis of these results reveals satisfactory optical properties, and a correlation between the thickness of the block copolymeric peeling layer and those optical properties, wide angle haze in particular.

The hot tack properties (Hot tack performance 15 psi/2 secs/out-out/90 g spring) of three of these films were also measured, and the results shown in Table 11:

TABLE 11

| | Avg % opening | | |
|---|---|---|---|
| Temp/° C. | Example 5 (TB32A30) | Example 7 (TG21D30 (/1uM)) | Example 9 (TG21B50) |
| 115 | 100 | 100 | 100 |
| 120 | 46 | 54 | 100 |
| 125 | 18 | 14 | 100 |
| 130 | 18 | 22 | 70 |
| 135 | 14 | 12 | 74 |
| 140 | 9 | 22 | 62 |

The hot tack properties (Hot tack performance 5 psi/0.5 secs/out-out/90 g spring) of three of these films were also measured, and the results shown in Table 12:

TABLE 12

| | Avg % opening | | |
|---|---|---|---|
| Temp/° C. | Example 5 (TB32A30) | Example 7 (TG21D30 (/1uM)) | Example 9 (TG21B50) |
| 115 | 100 | 100 | 100 |
| 120 | 100 | 100 | 100 |
| 125 | 35 | 30 | 100 |
| 130 | 6 | 18 | 100 |
| 135 | 4 | 11 | 100 |
| 140 | 4 | 15 | 71 |

The thickness in Examples 6-8 of the peeling layer (the BCP layer) vs. hot tack performance (15 psi/2 secs/out-out/90 g spring) is compared in Table 13

TABLE 13

| | BCP thickness | | |
|---|---|---|---|
| Temp/° C. | Example 6 (0.5 μm) | Example 7 (1 μm) | Example 8 (3 μm) |
| | | % opening | |
| 115 | 100 | 100 | 100 |
| 120 | 46 | 54 | 100 |
| 125 | 23 | 14 | 80 |
| 130 | 42 | 22 | 13 |
| 135 | 32 | 12 | 22 |
| 140 | 22 | 22 | 26 |

The thickness in Examples 6-8 of the peeling layer (the BCP layer) vs. hot tack performance (5 psi/0.5 secs/out-out/90 g spring) is compared in Table 14

TABLE 14

| | BCP thickness | | |
|---|---|---|---|
| Temp/° C. | Example 6 (0.5 μm) | Example 7 (1 μm) | Example 8 (3 μm) |
| | | % opening | |
| 115 | 100 | 100 | 100 |
| 120 | 100 | 100 | 100 |
| 125 | 100 | 30 | 100 |
| 130 | 15 | 18 | 100 |
| 135 | 10 | 11 | 100 |
| 140 | 24 | 15 | 66 |

Barrier Testing:

The Example 7 (TG21D30 with 1 μm BCP), the Example 8 (TG21D30 with 3 μm BCP) layer films and the Example 9 (TG21B50) film were subjected to barrier testing and the results are shown in Table 15

TABLE 15

| Example | Thickness (Avg)/μm | OTR ($cm^3 m^{-2} d^{-1}$) | OTR normalised fro thickness ($cm^3 \cdot mm \, m^{-2} d^{-1}$) |
|---|---|---|---|
| 7 | 30 | 1830 | 54900 |
| 8 | 31 | 1690 | 52390 |
| 9 | 50 | 1010 | 50500 |

These results show there is no significant difference in OTR compared with standard PP films.

EXAMPLES 11 AND 12 (12 BEING COMPARATIVE)

These examples were intended to investigate the suitability of one film in accordance with the invention in a reamwrap application Preparation of Film In Example 11 a four layer polymeric tube was formed by coextruding a core layer of polypropylene homopolymer (formulated with a migratory slip agent) with a layer of polyethylene/polypropylene/polybutylene terpolymer (a random copolymer comprising polypropylene (92% w/w)/ethylene (4% w/w)/butylene-1 (4% w/w)) as a skin layer (first sealing layer) on one side of the core layer, and with a peeling layer of a polypropylene-polyethylene block copolymer (available under the designation PPC 5660 from Total Petrochemicals) provided between the core layer and the first sealing layer. On the other side of the core layer was provided a laminating layer polyethylene/polypropylene/polybutylene terpolymer (a random copolymer comprising polypropylene (82% w/w)/ethylene (1% w/w)/butylene-1 (17% w/w)). The tube was cooled and subsequently reheated before being blown to produce a four layer biaxially oriented film tube. The film tube was then nipped and laminated to itself (laminating layer to laminating layer) spliced to form a laminated film with seven layers to provide a 58 μm thickness laminated film. The laminated film was then coated with a printable acrylic coating. The coated film was produced by applying a coating composition by a gravure process to both sides of the laminated film at a coating weight of 1 g/m$^2$ and dried the coating in an oven. The acrylic coating was formulated as a production batch using as a source of the acrylic material present in the coating WB1240. WB1240 is an acrylic copolymer dispersion in water supplied by Cytec Surface Specialities of Rue d'Anderlect 33 B-1620 Drogenbos Belgium and the quantity used was that necessary to give a coating composition on the films in which the WB 1240 formed 92.5 weight percent of the entire coating. The composition also contained 0.25 weight percent of polymethylmethacrylate particles as an antiblock and 7.5 weight percent of Carnauba wax.

In Example 12 (a Comparative Example) was used RC60, which is an oriented polypropylene film available from Innovia Films Ltd, Wigton, Cumbria CA7 9BG, United Kingdom.

The peel strength of these films was then measured at a range of sealing temperatures and the results are shown in Table 16. The Heat seal threshold was set at 15 psi/2 secs.

TABLE 16

| Temp | Example 11 (TC101A60) | | Example 12 (RC60) |
| --- | --- | --- | --- |
| | Average Peel strength g/25 mm2 | | |
| ° C. | Out-Out | In/In | RC60 |
| 85 | 0 | 0 | 0 |
| 90 | 350 | 36 | 1073 |
| 95 | 438 | 319 | 1214 |
| 100 | 445 | 358 | 1198 |
| 105 | 395 | 313 | 1119 |
| 110 | 392 | 321 | 1200 |
| 115 | 417 | 327 | 1170 |
| 120 | 410 | 334 | 1192 |
| 125 | 389 | 335 | 1176 |
| 130 | 402 | 385 | 1161 |
| 135 | 360 | 385 | NA |
| 140 | 457 | 462 | NA |

The peel strength (with the heat seal threshold set at 5 psi/0.5 secs.) of these films was then measured at a range of sealing temperatures and the results are shown in Table 17.

TABLE 17

| Temp ° C. | Average Peel strength g/25 mm2 | |
| --- | --- | --- |
| | Example 11 (Out-Out) | Example 12 (RC60) |
| 90 | 0 | 0 |
| 95 | 180 | 0 |
| 100 | 223 | 727 |
| 105 | 250 | 1212 |

TABLE 17-continued

| Temp ° C. | Average Peel strength g/25 mm2 | |
| --- | --- | --- |
| | Example 11 (Out-Out) | Example 12 (RC60) |
| 110 | 280 | 1020 |
| 115 | 321 | 1112 |
| 120 | 304 | 1169 |
| 125 | 326 | 1159 |
| 130 | 364 | 1025 |
| 135 | 352 | NA |
| 140 | 355 | NA |

The Example 11 film was peelable and suitable for a peelable reamwrap application. The Example 12 film was not peelable.

The invention claimed is:

1. A sealable and peelable film coextrudate to facilitate sealing and peeling, consisting essentially of:
   a core layer;
   an outer sealing layer, wherein the outer sealing layer is positioned on a first side of the core layer,
   wherein the outer sealing layer is openable without creating a z-direction tear,
   a second layer, wherein the second layer is positioned on a second side of the core layer; and
   a peeling layer, wherein the peeling layer is positioned either between the core layer and the outer sealing layer or between the core layer and the second layer and wherein the peeling layer is directly adjacent to and in contact with the outer sealing layer or the second layer,
   wherein the peeling layer comprises at least one block copolymeric component comprising at least one olefinic component,
   wherein at least a substantial portion of the peeling layer is shielded from the external environment thereby enhancing the durability of the peeling layer,
   wherein the relative thickness ratio of the peeling layer to the outer sealing layer or the second layer is from about 1:8 to 3:1,
   wherein the thickness of the peeling layer is from 0.3 μm to 3 μm,
   wherein the film has a wide angle haze value of less than about 5,
   wherein the core layer is thicker than the outer sealing layer, second layer and peeling layer, and wherein the core layer, outer sealing layer, second layer and peeling layer are formed as a coextrudate.

2. The sealable and peelable film of claim 1 manufactured as a single web.

3. The sealable and peelable film of claim 1, further comprising at least one additional layer formed by coextrusion, coating, or lamination.

4. The sealable and peelable film of claim 3, wherein the peeling layer is adjacent the core layer of the film.

5. The sealable and peelable film of claim 3, wherein there are no intervening layers between the peeling layer and the core layer.

6. The sealable and peelable film of claim 1, wherein the peeling layer comprises at least two olefinic components, the block copolymer being at least partially formed by the block copolymerisation of one olefinic component with another olefinic component.

7. The sealable and peelable film of claim 1, further comprising a wide angle haze value of less than about 4.

8. The sealable and peelable film of claim 1, wherein the thickness of the peeling layer is configured to provide a peel strength of less than 750 g/25 mm² when measured at a heat seal threshold at 15 psi/2 secs at a temperature of from 110° C. to 140° C.

9. The sealable and peelable film of claim 1, wherein the thickness of the peeling layer is configured to provide a peel strength of less than about 650 g/25 mm² when measured at a heat seal threshold at 5 psi/0.5 secs at a temperature of from 110° C. to 140° C.

10. The sealable and peelable film of claim 1 configured as a sealed package, a ream wrap package, or an overwrap package.

11. A sealable and peelable laminate film to facilitate sealing and peeling, consisting essentially of:
- a core layer;
- an outer sealing layer, wherein the outer sealing layer is positioned on a first side of the core layer, wherein the outer sealing layer is openable without creating a z-direction tear,
- a laminating layer, wherein the laminating layer is positioned on a second side of the core layer; and
- a peeling layer, wherein the peeling layer is positioned either between the core layer and the outer sealing layer or between the core layer and the laminating layer and wherein the peeling layer is directly adjacent to and in contact with the outer sealing layer or the laminating layer, wherein the peeling layer comprises at least one block copolymeric component comprising at least one olefinic component, wherein at least a substantial portion of the peeling layer is shielded from the external environment thereby enhancing the durability of the peeling layer, wherein the relative thickness ratio of the peeling layer to the outer sealing layer or the laminating layer is from about 1:8 to 3:1, wherein the thickness of the peeling layer is from 0.3 µm to 3 µm, wherein the film has a wide angle haze value of less than about 5, wherein the core layer is thicker than the outer sealing layer, laminating layer and peeling layer, and wherein the core layer, outer sealing layer, laminating layer and peeling layer are formed as a laminate.

12. The sealable and peelable laminate film of claim 11 further comprising two single webs, wherein a first laminating layer of a first web is laminated to a second laminating layer of a second web.

13. The sealable and peelable film of claim 11, further comprising a wide angle haze value of less than about 4.

14. The sealable and peelable film of claim 11, further comprising a gloss value at an angle of 45 degrees of at least about 75.

* * * * *